June 7, 1927. 1,631,182
R. I. ALEXANDER ET AL
TRACTION EQUIPMENT, FOR MOBILE MACHINERY
Filed Nov. 24, 1924 4 Sheets-Sheet 2
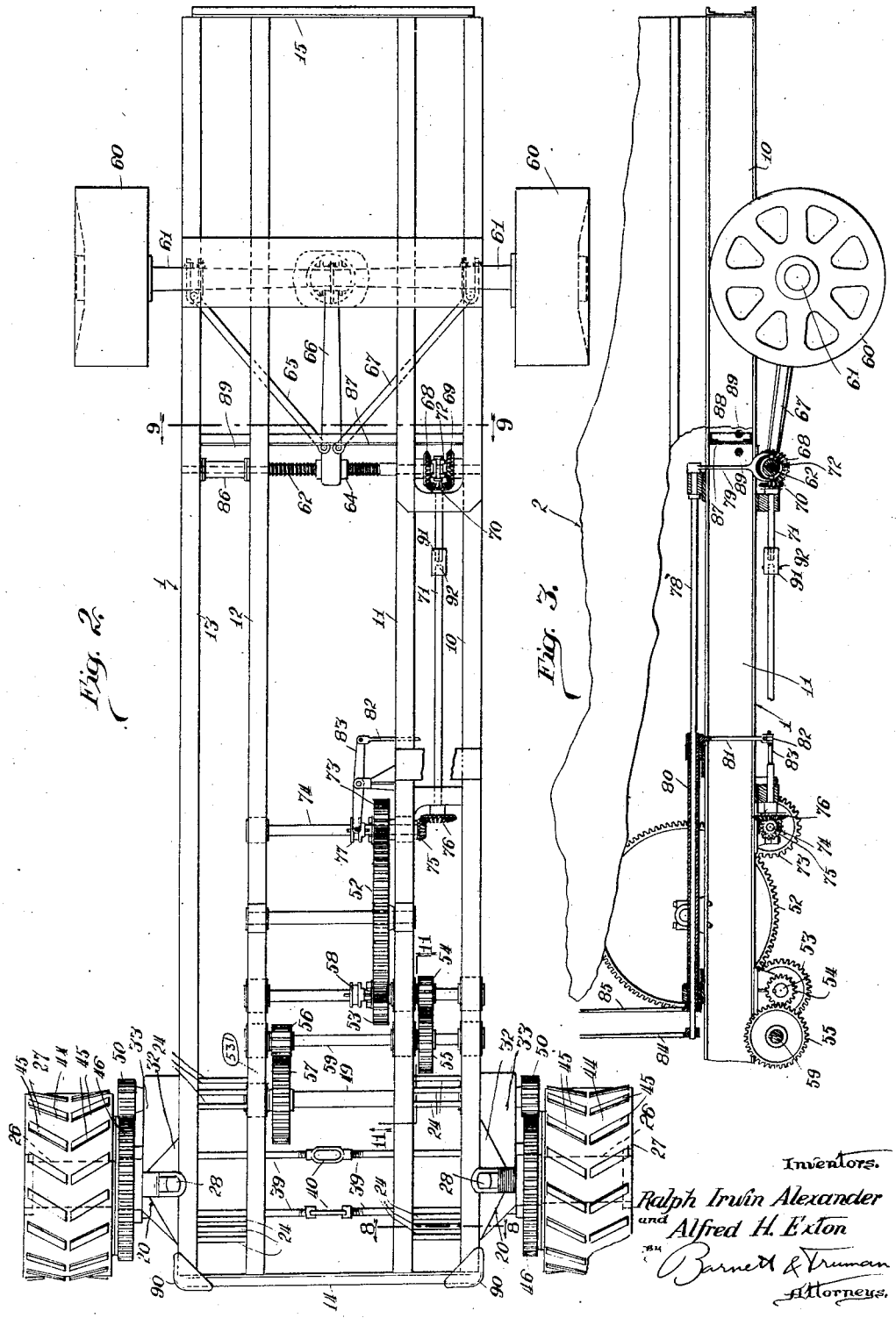
Inventors.
Ralph Irwin Alexander
and Alfred H. Exton
by Barnett & Truman
Attorneys.

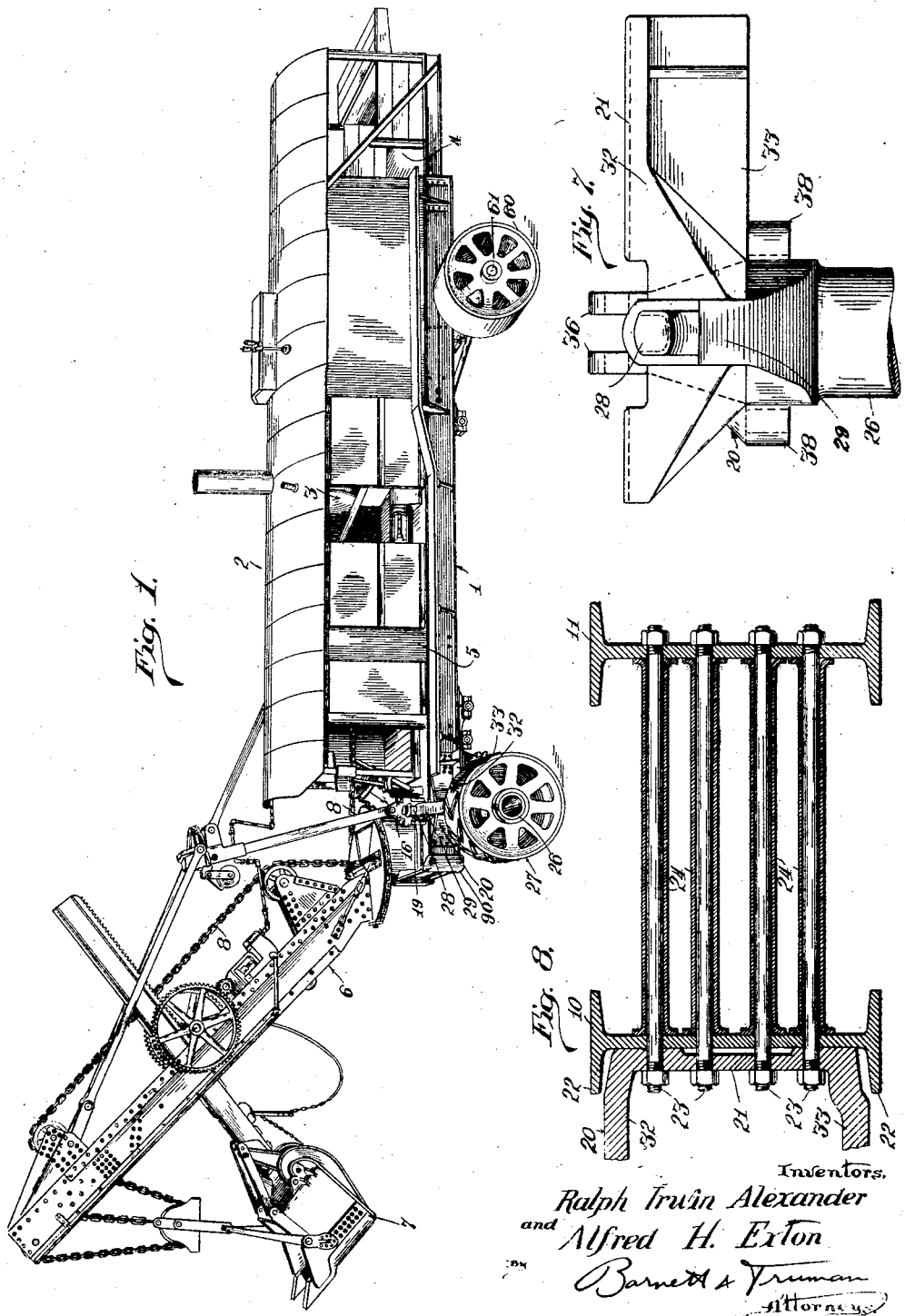

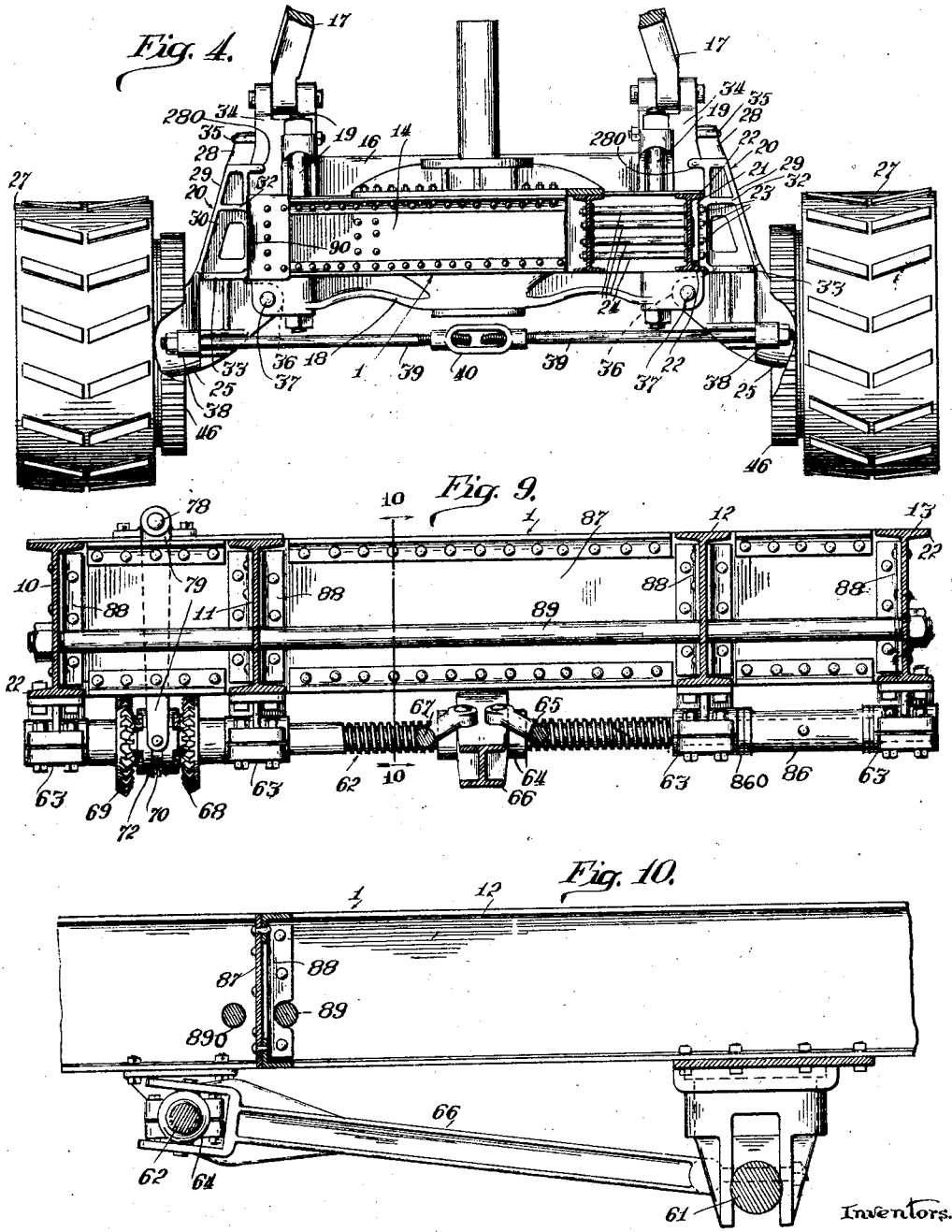

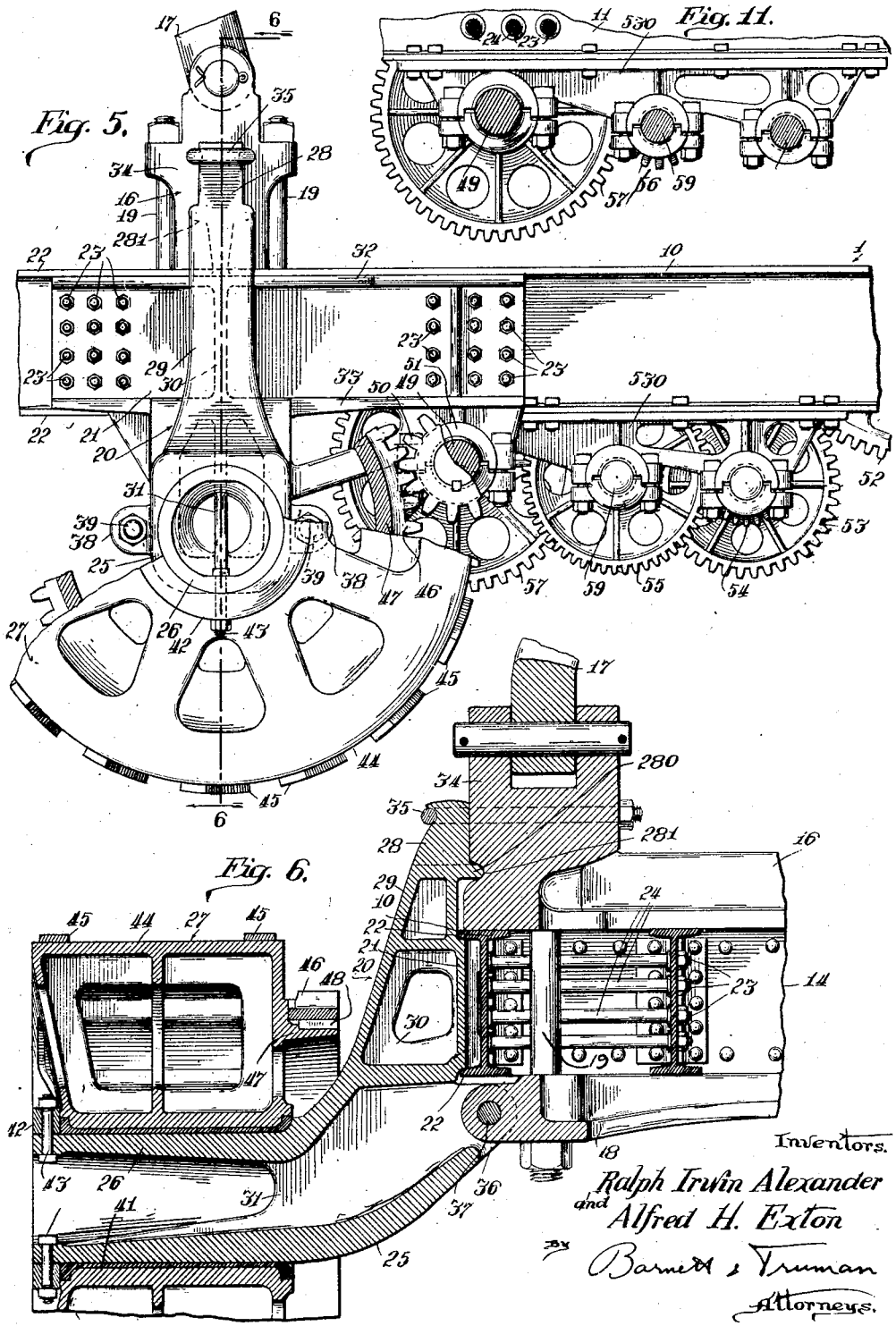

Patented June 7, 1927.

1,631,182

UNITED STATES PATENT OFFICE.

RALPH IRWIN ALEXANDER, OF KANKAKEE, AND ALFRED H. EXTON, OF CHICAGO HEIGHTS, ILLINOIS, ASSIGNORS TO INLAND ENGINEERING COMPANY, OF CHICAGO, ILLINOIS, A CORPORATION OF ILLINOIS.

TRACTION EQUIPMENT FOR MOBILE MACHINERY.

Application filed November 24, 1924. Serial No. 752,017.

This invention relates to traction equipment for mobile machinery, and more particularly to an improved supporting and transporting carriage for massive steam shovels or excavating machinery.

Machines of this type usually comprise a pivoted boom, centrally mounted at the front end of the carriage for supporting and controlling the bucket or other lifting apparatus, and a lifting winch and a power plant (usually steam operated) upon the central and rear portions of the carriage. Such machines are usually mounted upon a modified railway carriage, it being necessary to lay track sections in front or behind the carriage whenever it is moved in either direction. Jack arms extending laterally, outwardly and downwardly, from the front end of the machine, carry jack screws, which when the machine is in operation are screwed down into contact with the ground or other supporting surface, to steady the machine and takes a part or all of the weight of this end of the apparatus from the car trucks and tracks. To facilitate the transportation of such machines, they have also been mounted on creeping traction driving means of the endless chain type, but such apparatus is complicated and expensive, and the large supporting area is unnecessary when the machines are to be operated in stone quarries, or other places where the supporting terrain is fairly firm and substantial.

According to the present invention, the carriage is mounted upon large, broad faced supporting wheels, which project well beyond the sides of the carriage frame, and serve not only as supporting and transporting means, but also perform the function of the screw jacks previously used to brace the machine at the sides, when in service. These wheels have sufficient supporting area to carry the tremendous weight of the machine above the rocky floor of a stone quarry, and will also transport the machines easily over extremely uneven surfaces.

One object of this invention is to provide a carriage of the type just described, which has great strength, is easily operated, and is simple and economical in construction. The principles of this invention may be applied in the original manufacture of traction mountings for such machines, or may be applied in the conversion of the railway type of carriage heretofore used.

Another object of the invention is to provide an improved jack-arm, or mounting means, for the traction wheels, at the front or heavier end of the machine.

A further object is to provide improved driving connection for these wheels.

Another object is to provide improved means for bracing the carriage frame, to withstand the side thrusts and twisting strains of the wheel mountings and the power driven steering apparatus.

Further objects and advantages of the invention will be apparent from the following detailed description of one approved form of the apparatus.

In the accompanying drawing:

Fig. 1 is a perspective view of a steam shovel, mounted upon the improved traction equipment.

Fig. 2 is a plan view of the carriage, or chassis, with the super-structure removed.

Fig. 3 is a side elevation, partially broken away, of the central and rear portions of the carriage and supporting means.

Fig. 4 is a front elevation of the carriage on a somewhat larger scale, portions being broken away.

Fig. 5 is a side elevation, on a considerably larger scale, of one of the improved jack-arms, and adjacent portions of the carriage.

Fig. 6 is a vertical central section taken substantially on the line 6—6 of Fig. 5.

Fig. 7 is a plan view of a portion of one of the jack-arms.

Fig. 8 is a vertical detail section, on a considerably larger scale, taken substantially on the line 8—8 of Fig. 2.

Fig. 9 is an enlarged transverse vertical section, taken substantially on the line 9—9 of Fig. 2.

Fig. 10 is a vertical section, taken substantially on the line 10—10 of Fig. 9.

Fig. 11 is a detail section, taken substantially on the line 11—11 of Fig. 2.

Referring first to the steam shovel shown in Fig. 1, the carriage 1 supports a housing 2, in the central and rear portion of which is mounted the power plant 3, here indicated as the usual steam engine, a space 4 being provided for fuel and other accessories at the rear of the carriage. The lifting winch (not here shown) is mounted within the forward portion 5 of housing 2, and the boom 6 carrying the bucket or shovel 7 and the lifting and controlling mechanism therefor, is mounted at the front end of the carriage 1. The chain 8, the rear end of which is coiled around the winch, is a part of the manipulating mechanism for the bucket. All of this portion of the machine mounted above the carriage, with the exception of a few control features hereinafter described in detail, is old and is merely indicated here in a general way to indicate the character of the machine which is supported and transported upon the improved carriage and traction equipment hereinafter described in detail. It should be understood at the outset that these machines are extremely massive and heavy, often weighing considerably upwards of a hundred tons, so that ordinary carriage constructions cannot be used, due to the impracticability of constructing the ordinary carriage parts of sufficient size and strength to carry the enormous load, and withstand the side thrusts and tilting strains.

The front end of the carriage, where the greater portion of the weight is concentrated, is carried upon a pair of large, broad faced metal traction wheels 27. These wheels not only perform the function of the jack-arms heretofore used, but also serve as the driving traction means for moving the apparatus from place to place.

Due to the extremely heavy weight to be carried, and the wide spread between these wheels, it is impracticable to use a single cross axle construction for supporting the carriage from the wheels as in the ordinary carriage construction. For this reason we have devised an improved jack-arm, preferably formed of a single casting, for each wheel, which supports one side of the carriage from the adjacent wheel, although means are provided to tie the two wheel mountings together and distribute the stresses throughout the cross area of the carriage.

The carriage frame is formed of a plurality (here shown as four) of longitudinally extending, substantially parallel I-beams, indicated as 10, 11, 12 and 13, respectively. These may be structural I-beams, or may be built up of flat plates and angles riveted together. These I-beams are connected at the ends by plates or beams 14 and 15 respectively, and are intermediately connected and braced at suitable intervals, certain of the improved bracing constructions being hereinafter described in detail. Transversely of the front end of the carriage, upon the top of the frame beams, is mounted the transom 16, to the ends of which are pivoted the arms 17 which form a part of the supporting mechanism for the boom 6. Transversely across the bottom of the frame beams, directly beneath the transom 16, is mounted the bolster 18, which corresponds to the bolster used for supporting the carriage from an ordinary railway truck. The transom 16 and bolster 18 are secured to one another through the carriage frame by means of the vertically extending bolts 19.

Each jack-arm is preferably formed of a single casting, now to be described in detail. To explain the necessity for the peculiar construction here used, it might first be stated that each of these castings 20 is extremely massive, weighing several thousand pounds, the weights varying of course in accordance with the size and type of machine to which it is applied. Each jack-arm 20 has a supporting base 21 which extends a considerable distance both front and rear from the center of the jack-arm and fits snugly between the upper and lower flanges 22 of the adjacent side I-beams 10 or 13. A plurality of bolts 23 extend not only through the base 21 and the adjacent beam 10, but also through the next carriage frame beam 11, tubular spreaders 24 surrounding the bolts between the two frame beams. In this manner the supporting of the jack-arm is distributed between the two beams 10 and 11. An integral downwardly and outwardly extending arm 25 terminates in journal 26 upon which the wheel 27 is mounted. An upwardly extending projection 28 is connected with the upper portion of the base of journal 26 by the downwardly and outwardly extending rib 29. An inner vertical web 30 connects the outer rib 29 with the base 21, and this web continues downwardly as a web 31 into the hollow journal 26. Horizontal webs 32 and 33 connect the upper and lower edges of base 21 with the outer rib 29. Upper projection 28 of the jack-arm bears against the end portion 34 of transom 16 and is firmly secured thereto by U-bolt 35. Inwardly projecting flange 280, on upward projection 28, engages in a corresponding transverse groove 281 in the end of the transom, thus forming a means for taking up a portion of the vertical thrust. A pair of inwardly projecting ears 36, at the lower end of the jack arm, are secured by bolt or crosspin 37 to an interfitting portion of the end of bolster 18. A pair of laterally projecting ears 38, near the lower end of each jack arm, are connected with the respectively opposed ears of the jack-arm on the opposite side of the frame by means of tie bolts 39, having turn-buckles 40 placed intermediately therein.

Each wheel 27 is built up of suitable heavy metallic members, and is mounted on journal 26 by means of an interposed bushing 41. At the outer end of journal 26 an annular collar 42, secured to the journal by bolts 43, holds the wheel in place upon the journal.

The broad face or periphery 44 of the wheel is provided with a series of staggered cleats 45 to insure the necessary traction engagement with the ground. An annular driving gear 46 is shrunk upon an inwardly extending annular flange 47 of the wheel, and further secured thereto by means of keys 48. A horizontal drive shaft 49, having a driving pinion 50 secured to each end thereof, the pinions 50 meshing with the annular gears 46, is mounted in bearings 51, the upper halves of which are formed integrally with the adjacent laterally extending portion of the jack-arm. In this manner the side driving thrust between the pinions and gears is taken up within the integral jack-arm casting, and the pinions and gears are always held in the proper driving engagement. Drive shaft 49 is driven from the large gear 52 on the drum or winch driving mechanism, through a train of reduction gears 53, 54, 55, 56, and 57. By means of clutch 58 on the intermediate shaft 59, this drive may be thrown into or out of gear as desired.

As best shown in Figs. 5 and 11, the bearings 530 and 531 for the ends of the several countershafts carrying the train of reduction gears, are preferably formed integrally with one another to hold the several pairs of gears in permanent mesh and resist the separating thrusts caused by the enormous loads.

It will be noted that the vertical supporting strain of the load is transmitted to the wheels 27 through the jack-arms, by means of transom 16, bolster 18, and both frame beams 10 and 11. The longitudinal twisting strains are taken up by the laterally extending portions of base 21, the horizontal webs 32 and 33, and the cross-tie bolts 39. The driving stresses from drive shaft 49 are also distributed through these same members, since the bearings 51 for the drive shaft are integral with the jack-arms.

The jack-arms are not only connected to the several beams of the frame but are independently connected one with the other through the transom above the frame, and the bolster below the frame, as well as by the tie bolts 39. This form of mounting permits the wheels to be spaced sufficiently far apart, that is, have such a wide "tread" that the tilting loads will be adequately supported, even when the bucket is used at one side or other of the carriage.

The load to be supported at the rear end of the carriage is not so great, and the wheels 60 may be placed closer together, so that an axle 61 of the usual type may be used, this axle being centrally pivoted so that wheels 60 may be shifted to steer the carriage. A cross shaft 62, whose central portion is threaded, is mounted in bearings 63 secured to the lower sides of frame beams 10, 11, 12 and 13. A nut 64 is movable along the threaded portion of shaft 62, this nut being connected with the axle 61 by rods or links 65, 66, 67, whereby movement of nut 64 longitudinally of shaft 62 will shift axle 61 angularly in one direction or the other about its central pivot. A pair of oppositely facing beveled gears 68 and 69 are mounted loosely on shaft 62 between the bearings 63 suspended from beams 10 and 11. A beveled gear 70 on longitudinally extending drive shaft 71, meshes with beveled gears 68 and 69 and drives them simultaneously in opposite directions. By means of an intermediate clutch 72 keyed to shaft 62, either gear 68 or 69 may be keyed to this shaft. The mechanism just described constitutes a reversible driving mechanism for turning screw shaft 62 in either direction as desired. In mechanisms of this type heretofore in use, this power driven steering mechanism has been actuated by a separate driving unit such as a motor or donkey engine. In the present improved construction, this steering mechanism is actuated, when desired, from the same driving means which actuates the winch and the traction wheels, as previously described. Drive shaft 71 is driven from main driving gear 52 through the gear 73 loose on intermediate shaft 74, and the beveled gears 75 and 76 keyed to shafts 74 and 71, respectively. By means of clutch 77, gear 73 may be keyed to shaft 74 when desired. Reversing clutch 72 is actuated from rock shaft 78 by means of crank arm 79 at one end of the rock shaft. Power clutch 77 is actuated from the tubular rock shaft 80 which surrounds rock shaft 78, by means of crank arm 81 at the rear end of the rock shaft and the intermediate link 82 and lever 83. Rock shafts 78 and 80 are controlled from the front of the machine, where the operator will be positioned, by means of the conveniently located hand levers 84 and 85 respectively. When it is desired to shift the steering wheels in either direction, the operator manipulates lever 84 to determine the direction of travel of nut 64, and then manipulates lever 85 to throw on the power. This shifting of the steering wheels may be accomplished either while the traction wheels 27 are being driven to move the carriage, or while the carriage is otherwise at rest. This will be determined by whether or not power clutch 58 is in operative or inoperative position. Of course, while the winch is being driven to operate the lifting mechanism for the bucket, both clutches 58 and 77 will be out of engagement with the respective gears 53 and 73, and the traction and steering mechanisms will be at rest.

In order to distribute the side thrusts of screw shaft 62 between the several frame beams, we have devised the improved cross-brace construction now to be described. A spreader 86 keyed to the shaft 62 bears at its ends, through thrust washers 860 against the adjacent bearings 63 to impart the thrusts thereto according to the direction in which the steering mechanism is being driven. Between the several beams 10, 11, 12, and 13 are positioned a series of properly shaped plates 87 having angle flanges 88 riveted or bolted thereto and to the respective frame beams. One or more tie-bolts 89 are secured through the several beams 10, 11, 12 and 13, and the angled flanges 88 of the several intermediate brace plates 87 which are positioned end to end between the several beams. This bolt 89 is preferably placed nearer the lower edges of the frame beams where the spreading force of the screw shaft 62 is concentrated. If desired, one or more additional tie-bolts 890 may be secured through the frame beams at a position spaced laterally from bolt 89, and at the other side of the plates 87, to resist forces tending to buckle the beams. In this way, the thrust of shaft 62 when transmitted to the bearing 63 will be distributed evenly between the several frame beams.

The steering mechanism above described, and the supporting structure at the rear of the carriage, are not claimed herein, but are made the subject-matter of a divisional application, Serial No. 46,458, filed July 27, 1925.

The front corners of the carriage frame where beams 10 and 13 are connected by the cross beam 14, may be protected by the corner castings 90, so that when bucket 7 or other swinging means accidentally bumps thereagainst, the frame will not be distorted or needlessly injured. These castings 90 are shaped to interfit with the flange beams to which they are applied, and are secured thereto by suitable bolts as indicated.

Preferably the shaft 71 will be divided at some intermediate point, and the sections connected by a coupling sleeve 91, permanently secured to one shaft section, and connected with the other section by means of a frangible pin 92 which will break under undue stress to avoid injury to other portions of the steering mechanism.

Although certain preferred forms of the several features of this invention have been disclosed in the preceding specification, and accompanying drawings, it is obvious that many changes in proportions and design might be adopted, and equivalents might be used, without departing from the scope of the invention as set forth in the following claims.

We claim:

1. In traction equipment for heavy mobile machinery, a carriage including a supporting frame formed of spaced metal beams, a pair of traction wheels for supporting and transporting one end of the frame, and a jack-arm support for each wheel formed of a single casting including a base portion extending horizontally at each side of the jack-arm and interfitting with and attached to the adjacent side frame beam, a downwardly and outwardly extending arm and an integral journal for the wheel projecting horizontally from the lower portion of the arm.

2. In traction equipment for heavy mobile machinery, a carriage including a supporting frame formed of spaced metal beams, a pair of traction devices for supporting and transporting one end of the frame, and a jack-arm support for each traction device formed of a single casting including a base portion extending horizontally at each side of the jack-arm and interfitting with and attached to the adjacent side frame beams, and a downwardly and outwardly extending arm terminating in a pivotal support for the traction device.

3. In traction equipment for heavy mobile machinery, a carriage including a supporting frame formed of spaced metal I-beams, a pair of traction devices for supporting and transporting one end of the frame, and a jack-arm support for each traction device formed of a single casting including a base portion extending horizontally at each side of the jack arm, this base portion fitting within the channel of the I-beam and secured to the beam, and a downwardly and outwardly extending arm terminating in a pivotal support for the traction device.

4. In traction equipment for heavy mobile machinery, a carriage including a supporting frame formed of spaced metal beams, a pair of traction wheels for supporting and transporting one end of the frame, and a jack-arm support for each wheel formed of a single casting including a broad supporting base attached to the side beams of the carriage frame and an integral hollow stub-shaft for the wheel, having an internal bracing web therein.

5. In traction equipment for heavy mobile machinery, a carriage including a supporting frame formed of spaced metal beams, a pair of traction wheels for supporting and transporting one end of the frame, and a jack-arm support for each wheel formed of a single casting including a broad supporting base interfitting with and attached to the adjacent side frame beam of the carriage, a downwardly and outwardly projecting portion terminating in a journal for the wheel, and having a pair of laterally extending ears, and tie-bolts extending beneath the frame and connecting the opposed pairs of ears on the jack arms at opposite sides of the frame.

6. In traction equipment for heavy mobile machinery, a carriage including a supporting frame formed of a plurality of spaced substantially parallel metal beams, a pair of traction wheels for supporting and transporting one end of the frame, and a jack arm support for each wheel formed of a single casting having a broad support base interfitting with the outer side portion of the adjacent side frame beam, and an integral journal for the wheel, a plurality of tie-bolts secured through the supporting base, the side beam, and the next adjacent frame beam, and spreader members between these two beams.

7. In traction equipment for heavy mobile machinery, a carriage including a supporting frame formed of a plurality of spaced substantially parallel metal beams, a pair of traction wheels for supporting and transporting one end of the frame, and a jack arm support for each wheel formed of a single casting having a broad support base interfitting with the outer side portion of the adjacent side frame beam, and an integral journal for the wheel, a plurality of tie-bolts secured through the supporting base, the side beam, and the next adjacent frame beam, and spreaders surrounding the bolts between these two beams.

8. In traction equipment for heavy mobile machinery, in combination with a carriage formed of a plurality of spaced metal beams, a transom supported transversely above and upon these beams, and a pair of traction wheels for supporting and transporting this end of the frame, a jack arm for each wheel including a supporting base extending horizontally at each side of the jack arm and interfitting with and secured to the adjacent side frame beam, an upwardly extending portion secured to the end of the transom, and a downwardly and outwardly extending portion terminating in an integral journal for the wheel.

9. In traction equipment for heavy mobile machinery, in combination with a carriage formed of a plurality of spaced metal beams, a bolster mounted transversely beneath the frame beams, and a pair of traction wheels for supporting and transporting this end of the frame, a jack-arm for each wheel including a supporting base extending horizontally at each side of the jack arm and interfitting with and secured to the adjacent side frame beam and a downwardly extending portion secured to the end of the bolster, and having an outwardly extending integral journal for the wheel.

10. In traction equipment for heavy mobile machinery, in combination with a carriage formed of a plurality of spaced metal beams, a bolster mounted transversely beneath the frame beams, and a pair of traction wheels for supporting and transporting this end of the frame, a jack arm for each wheel including a broad supporting base interfitting with and secured to the adjacent side frame beam and a downwardly extending portion secured to the end of the bolster, and having an outwardly extending integral journal for the wheel, and a pair of laterally extending ears, and a pair of tie-bolts connecting the opposing pairs of ears on the jack-arms at opposite sides of the frame.

11. In traction equipment for heavy mobile machinery, in combination with a carriage including a supporting frame formed of a plurality of spaced metal beams, a transom supported transversely above the upon these beams, and a bolster mounted transversely below the beams and connected with the transom thereabove, a pair of traction wheels for supporting and transporting this end of the frame, and a jack-arm support for each wheel formed of a single casting having a supporting base extending horizontally at each side of the jack-arm and secured to and interfitting with the adjacent side frame beam, an upwardly extending portion secured to the end of the transom, a downwardly extending portion secured to the end of the bolster, and an outwardly extending portion terminating in an integral journal for the wheel.

12. In traction equipment for heavy mobile machinery, in combination with a carriage including a supporting frame formed of a plurality of spaced metal beams, a transom supported transversely above and upon these beams, and a bolster mounted transversely below the beams and connected with the transom thereabove, a pair of traction wheels for supporting and transporting this end of the frame, and a jack arm support for each wheel formed of a single casting having a broad supporting base secured to and interfitting with the adjacent side frame beam, an upwardly extending portion secured to the end of the transom, a downwardly extending portion secured to the end of the bolster, and having a pair of laterally extending ears, and an outwardly extending portion terminating in an integral journal for the wheel, and a pair of tie-bolts connecting the opposing pairs of ears on the jack-arms at opposite sides of the frame.

13. In traction equipment for heavy mobile machinery, in combination with a carriage including a supporting frame formed of a plurality of spaced metal beams, a transom supported transversely above and upon these beams, and a bolster mounted transversely below the beams and connected with the transom thereabove, a pair of traction wheels for supporting and transporting this end of the frame, each wheel having an annular gear on its inner side, a drive shaft, pinions on each end thereof meshing with and driving the annular gears, and a jack-arm support for each wheel having a broad supporting base secured to and interfitting with the adjacent side frame beam, an upwardly extending portion secured to the end of the transom, a downwardly extending portion secured to the end of the bolster, and outwardly extending portion terminating in a journal for the wheel, and a bearing for the drive shaft formed as a portion of the supporting base.

14. In traction equipment for heavy mobile machinery, in combination with a carriage including a supporting frame formed of a plurality of spaced metal beams, a transom supported transversely above and upon these beams, and a bolster mounted transversely below the beams and connected with the transom thereabove, a pair of traction wheels for supporting and transporting this end of the frame, each wheel having an annular gear on its inner side, a drive shaft, pinions on each end thereof meshing with and driving the annular gears, and a jack arm support for each wheel having a broad supporting base secured to and interfitting with the adjacent side frame beam, an upwardly extending portion secured to the end of the transom, a downwardly extending portion secured to the end of the bolster, and having a pair of laterally extending ears, an outwardly extending portion terminating in a journal for the wheel, a bearing for the drive shaft formed as a part of the supporting base, and a pair of tie-bolts connecting the opposing pairs of ears on the jack arms at opposite sides of the frame.

15. In traction equipment for heavy mobile machinery, a carriage including a supporting frame formed of spaced metal beams, a pair of traction devices for supporting and transporting one end of the frame, and a jack-arm support for each traction device formed of a single casting including a broad supporting base interfitting with and attached to the adjacent side frame beam of the carriage, and a downwardly and outwardly projecting portion terminating in a pivotal support for the traction device, and having a pair of laterally extending ears, and tie-bolts extending beneath the frame and connecting the opposed pairs of ears on the jack-arms at opposite sides of the frame.

16. In traction equipment for heavy mobile machinery, a carriage including a supporting frame formed of a plurality of spaced substantially parallel metal beams, a pair of traction devices for supporting and transporting one end of the frame, and a jack-arm support for each traction device formed of a single casting having a broad supporting base interfitting with the outer side portion of the adjacent side frame beam, and an integral pivotal support for the traction device, a plurality of tie-bolts secured through the supporting base, the side beam and the next adjacent frame beam, and spreader members between these two beams.

17. In traction equipment for heavy mobile machinery, a carriage including a supporting frame, a pair of traction wheels, for supporting and transporting one end of the frame, a jack-arm support for each wheel formed of a single casting including a supporting base extending horizontally at each side of the jack-arm and attached to and interfitting with the frame, and an integral journal for the wheel, and means separate from the frame for rigidly connecting the two jack-arms.

18. In traction equipment for heavy mobile machinery, a carriage including a supporting frame, a pair of traction wheels for supporting and transporting one end of the frame, a jack-arm support for each wheel formed of a single casting including a supporting base extending horizontally at each side of the jack-arm and attached to and interfitting with the frame, and an integral journal for the wheel, and means extending both above and below the frame for rigidly connecting the two jack-arms.

19. In traction equipment for heavy mobile machinery, a carriage including a supporting frame, a pair of traction wheels for supporting and transporting one end of the frame, each wheel having a driving gear on the inner side thereof, a driving shaft, and a driving pinion at each end of the shaft meshing with one of the wheel gears, a jack-arm support for each wheel formed of a single casting including a supporting base attached to the carriage frame, an integral journal for the wheel, and an integral bearing for one end of the drive-shaft.

20. In traction equipment for heavy mobile machinery, a carriage including a supporting frame, a pair of traction wheels for supporting and transporting one end of the frame, each wheel having a driving gear on the inner side thereof, a driving shaft, and a driving pinion at each end of the shaft meshing with one of the wheel gears, a jack-arm support for each wheel formed of a single casting including a supporting base attached to the carriage frame, an integral journal for the wheel, an integral bearing for one end of the drive-shaft, a train of driving gears for transmitting driving power to the drive-shaft, a plurality of countershafts carrying this train of gears, and integrally formed bearings carried by the frame for similar ends of these several shafts to hold the gears in permanent mesh.

RALPH IRWIN ALEXANDER.
ALFRED H. EXTON.